(12) United States Patent
Irimajiri

(10) Patent No.: US 7,543,245 B2
(45) Date of Patent: Jun. 2, 2009

(54) INFORMATION PROCESSING DEVICE, MENU DISPLAYING METHOD AND PROGRAM STORING MEDIUM

(75) Inventor: Mayu Irimajiri, Tokyo (JP)

(73) Assignee: Sony Corporation (JP)

( * ) Notice: Subject to any disclaimer, the term of this patent is extended or adjusted under 35 U.S.C. 154(b) by 508 days.

(21) Appl. No.: 10/182,591

(22) PCT Filed: Nov. 30, 2001

(86) PCT No.: PCT/JP01/10515

§ 371 (c)(1),
(2), (4) Date: Oct. 30, 2002

(87) PCT Pub. No.: WO02/46900

PCT Pub. Date: Jun. 13, 2002

(65) Prior Publication Data

US 2003/0112279 A1    Jun. 19, 2003

(30) Foreign Application Priority Data

Dec. 7, 2000    (JP)    ............................. 2000-373497

(51) Int. Cl.
G06F 3/048    (2006.01)
(52) U.S. Cl. ........................ 715/836; 715/765; 715/835; 715/850; 715/853
(58) Field of Classification Search ................. 715/836, 715/850, 853, 765, 835
See application file for complete search history.

(56) References Cited

U.S. PATENT DOCUMENTS

| | | | |
|---|---|---|---|
| 5,303,388 A | 4/1994 | Kreitman et al. ............ 395/159 |
| 5,724,492 A * | 3/1998 | Matthews et al. ........... 345/419 |
| 5,945,985 A * | 8/1999 | Babin et al. .................. 715/209 |
| 6,028,600 A * | 2/2000 | Rosin et al. .................. 715/718 |
| 6,184,884 B1 * | 2/2001 | Nagahara et al. ............ 715/828 |
| 6,266,098 B1 * | 7/2001 | Cove et al. ................... 348/563 |
| 6,295,062 B1 | 9/2001 | Tada et al. ................... 345/348 |
| 6,466,237 B1 * | 10/2002 | Miyao et al. ................. 715/838 |
| 6,621,509 B1 * | 9/2003 | Eiref et al. ................... 715/836 |
| 6,880,132 B2 * | 4/2005 | Uemura ....................... 715/848 |

FOREIGN PATENT DOCUMENTS

JP    11143676    5/1995

* cited by examiner

*Primary Examiner*—Stephen S Hong
*Assistant Examiner*—Sajeda Muhebbullah
(74) *Attorney, Agent, or Firm*—Lerner, David, Littenberg, Krumholz & Mentlik, LLP

(57) ABSTRACT

A display for displaying a high-hierarchical menu and a lower-hierarchical menu corresponding to the high hierarchical menu on a display section, the high-hierarchical menu is displayed on the front side of a virtual cubic menu on the display section, and when it is recognized that the cubic menu has been selected by an inputting operation, the cubic menu is turned and the turning process is displayed with preset interpolation images and then the lower-hierarchical menu is displayed on the top side after the cubic menu is turned. In this manner, the visible continuousness of the change from the high-hierarchical menu to the lower-hierarchical menu can be maintained, thus making it possible to allow the user to easily recognize the change from the high-hierarchical menu to the lower-hierarchical menu.

5 Claims, 9 Drawing Sheets

INFORMATION PROCESSING DEVICE, MENU DISPLAYING METHOD AND PROGRAM STORING MEDIUM

TECHNICAL FIELD

The present invention relates to an information processing device, a menu display method and a program storage medium, and is suitably applied to a portable telephone, for example.

BACKGROUND ART

A portable telephone lists and displays plural items corresponding to various functions on a display section which is a liquid crystal display, carries out processing corresponding to an item selected and confirmed by a user with an arrow key or the like, and displays the processing results.

In this case, the portable telephone displays high-hierarchical menus obtained through classification into, for example, various functions, on the display section, and when the user selects a high-hierarchical menu, it changes the display to a lower-hierarchical menu corresponding to the selected high-hierarchical menu.

In such portable telephone, when the display is changed to a lower-hierarchical menu from a high-hierarchical menu, the contents on the display are changed in a moment, so that it is hard for non-skilled users to recognize this change from the high-hierarchical menu to the lower-hierarchical menu, which is a usability problem.

DESCRIPTION OF THE INVENTION

The present invention is made in view of aforementioned points, and proposes an information processing device, menu display method and program storage medium which are capable of improving the usability of menus.

In the present invention to solve such problems, in the case of displaying a high-hierarchical menu and a lower-hierarchical menu including items corresponding to a high-hierarchical menu on a display section, the high-hierarchical menu is indicated on one side of a virtual polyhedron being displayed on the display section, and the polyhedron is turned and the turning processes is displayed with preset interpolation images when it is confirmed that a high-hierarchical menu has been selected by an inputting operation, and then the lower-hierarchical menu is indicated on another side after the polyhedron is turned. This process can maintain the visible continuousness from the high-hierarchical menu to the lower-hierarchical menu, so that the user can easily recognize the change in the display from the high-hierarchical menu to the lower-hierarchical menu, thus making it possible to realize an information processing device, menu display method and program storage means which are capable of improving the usability of menus.

BEST MODE FOR CARRYING OUT THE INVENTION

Hereinafter, one embodiment of this invention will be described in detail with reference to the accompanying drawings.

(1) Construction of Camera-Integrated Digital Portable Telephone

Figure 1:
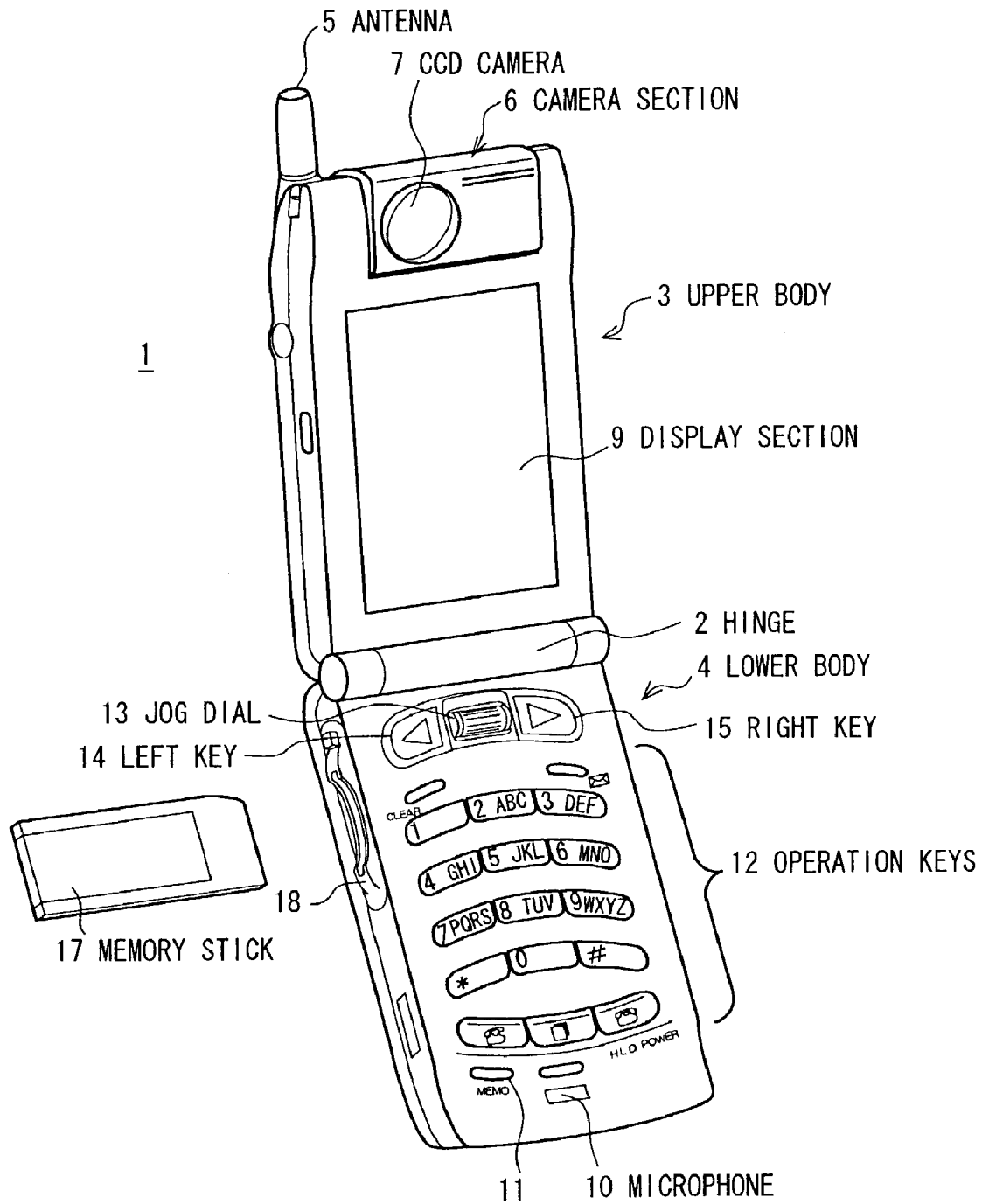
FIG. 1 is a schematic diagram showing the outside construction of a camera-integrated digital portable telephone according to one embodiment of the present invention.

FIG. 1 shows a camera-integrated digital portable telephone 1 (hereinafter, referred to as a portable telephone) as an information processing device of this invention as a whole. This portable telephone 1 can be divided into an upper body 3 and a lower body 4 with a central hinge 2 as a border so that it is foldable at the hinge 2.

As to the upper body 3, a telescopic antenna 5 for transmission and reception is attached at the top-left part, and a camera section 6 is arranged at upper-central part and can be turned within approximately 180 degrees, so that a CCD (Charge Coupled Device) camera 7 of the camera section 6 can capture desired objects.

Figure 2:
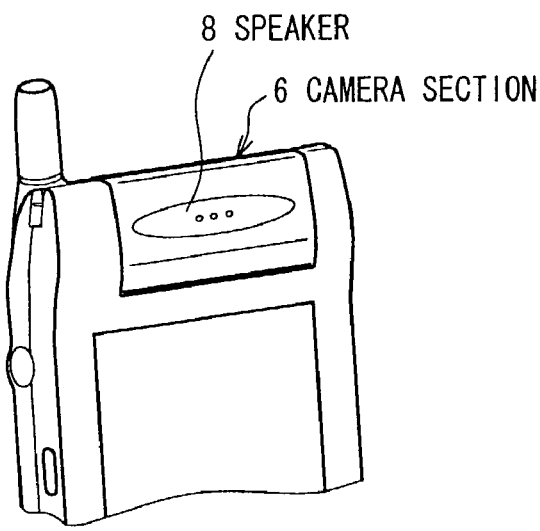
FIG. 2 is a schematic diagram showing an upper body when a camera section is turned.

By the way, when a user positions the camera section 6 by turning it by approximately 180 degrees, a speaker 8 which has been arranged at the center on the back side of the camera section 6 is positioned on the front side as shown in FIG. 2, which changes to a normal voice communication function.

In addition, the upper body 3 has a display section 9 which is a liquid crystal display with 256 colors, on the front, so as to display various information including menus corresponding to various functions, radio wave reception quality, battery level, outgoing call history, incoming call history, E-mails, simple home pages, and pictures captured with the CCD camera 7 of the camera section 6, on the display section 9.

On the other hand, the lower body 4 is provided with a microphone 10 and a memo button 11 at a lower part of its front side, so that the microphone 10 can collect user voices during conversation and pressing the memo button 11 can record voices of the chatting mate during conversation.

In addition, the lower body 4 is provided with plural operation keys 12 including numeral keys of "0"-"9", a call key, a redial key, an end and power key, a clear key and an E-mail key, in the center of its front side, a rotation and press operating means (hereinafter, referred to as a jog dial) 13 which can be rotated and pressed, above the operation keys 12, a left key 14 and right key 15 for inputting movements to the left and right, on the both sides of the jog dial 13, so that various processing including an item selection of a menu, call processing, creation of an E-mail, data communication can be carried out through the operations of the operation keys 12, jog dial 13, left key 14 and right key 15.

For example, the portable telephone 1 can automatically call on a telephone number when a user selects the desired telephone number out of plural telephone numbers of a directory list being displayed on the display section 9, by rotating the jog dial 13 and confirms the selected telephone number by pressing the jog dial 13.

Figure 3:
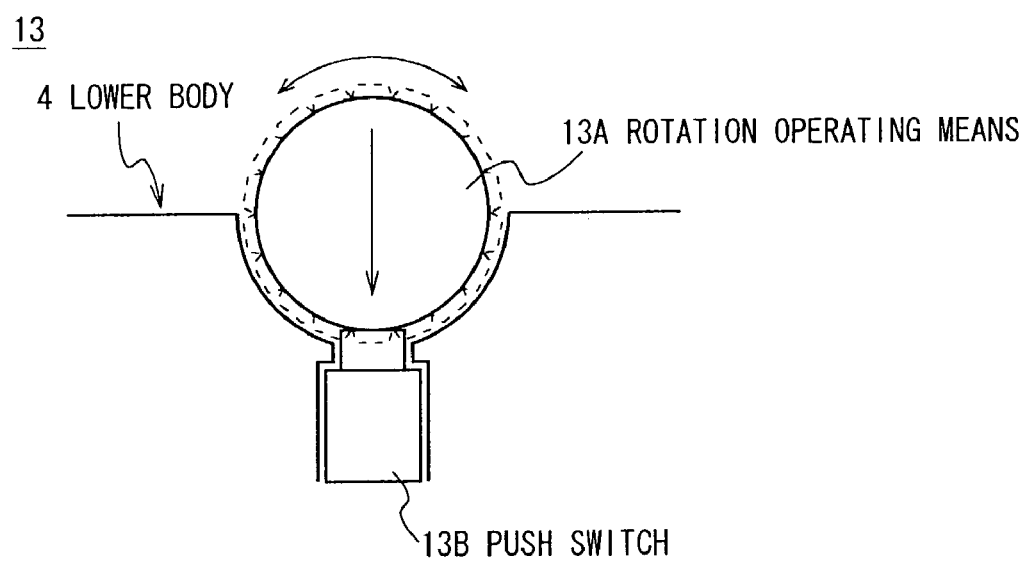
FIG. 3 is a schematic sectional diagram showing the sectional construction of a jog dial.

As to the jog dial 13, a column rotation operating means 13A is attached so as to slightly project from the front surface of the lower body 4 as shown in FIG. 3, so that the rotation operating means 13A can be easily rotated and pressed with the user's thumb.

The jog dial 13 generates a pulse signal which is equivalent to the rotating operation, via a built-in rotary encoder every time when the rotation operating means 13A is rotated, and then notifies internal units of the rotated amount, and every time when the rotation operating means 13A is pressed, notifies the internal units via a push switch 13B that an item has been confirmed.

Note that, a battery pack which is not shown is inserted on the back side of the lower body 4, and when the power is turned on by operating the operation key 12, power is supplied from the battery pack to the internal unit blocks so as to activate the telephone.

In addition, in the lower body 4, a memory stick slot 18 to receive a removable memory stick (trade mark by Sony Corp.) is provided on the top of the left side of the lower body 4, so that voice of the chatting mate can be recorded into the memory stick 17 during conversation by the pressing operation of the memo button 11, E-mails, simple home pages, and pictures captured with the CCD camera 7 can be recorded therein by the operations of an operation inputting section 16, and also various data recorded can be read out.

This memory stick 17 is a kind of flash memory card which was developed by Sony Corp. which is the assignee of this application, and is produced by containing a flash memory element comprising an EEPROM (Electrically Erasable and Programmable Read Only Memory) which is an electrically rewritable and erasable non-volatile memory, into a small thin plastic case, which allows various data such as pictures, voice and music to be record and read out via a ten-pin terminal.

In addition, for such a case that a built-in flash memory is changed in its specification so as to have larger capacity, the memory stick 17 adopts a special serial protocol which is capable of being utilized by other devices, so as to realize a high performance of the maximum storing rate of 1.5 [MB/S] and the maximum reading rate of 2.45 [MB/S] and to offer high reliability with an erroneous-deletion avoiding switch.

Therefore, the portable telephone 1 can be utilized with the memory stick 17 inserted therein, thus making it possible to share data with other electronic devices via the memory stick 17.

(2) Circuit Construction of Camera-Integrated Digital Portable Telephone

Figure 4:
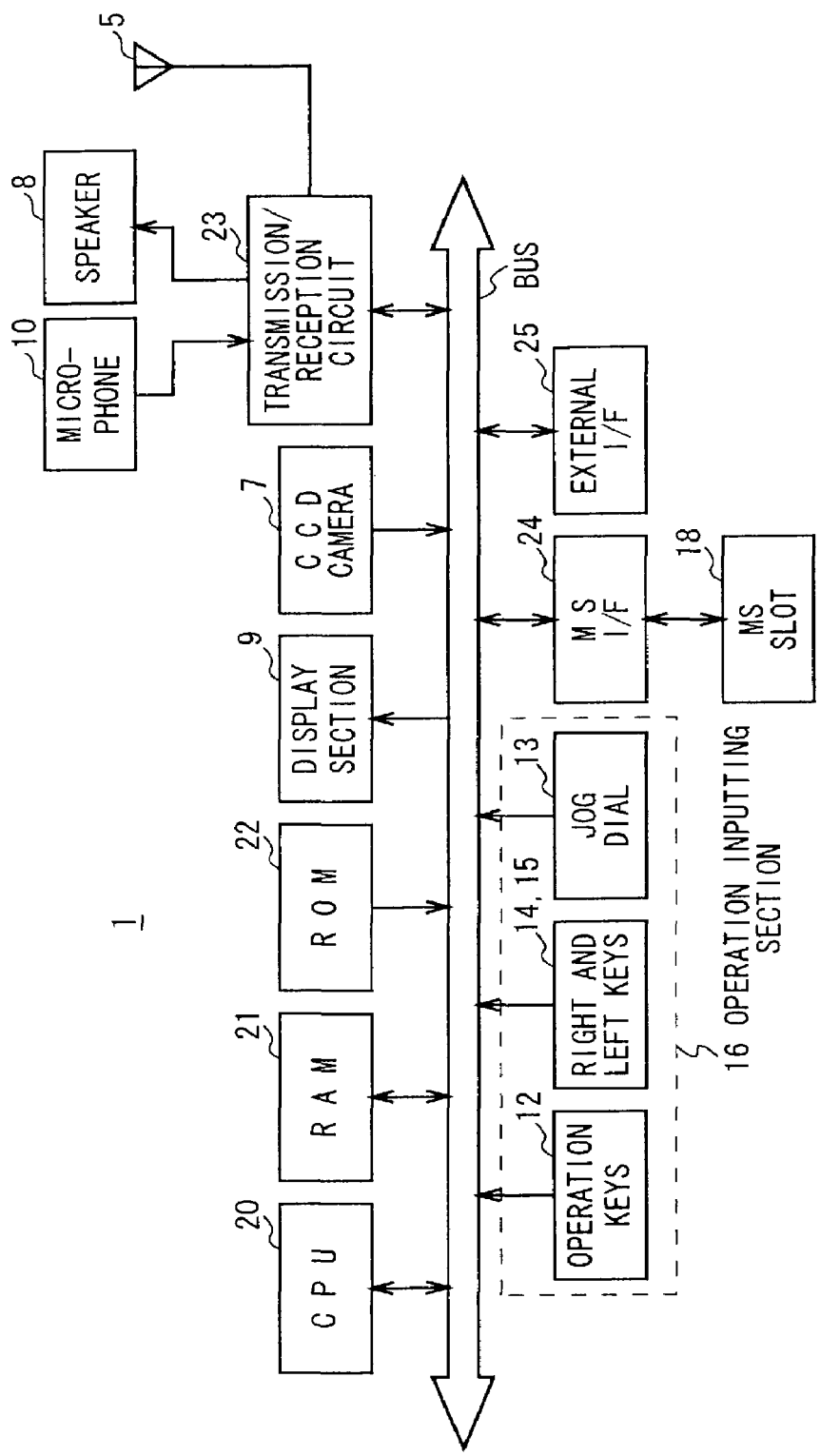
FIG. 4 is a block diagram showing the circuit construction of the camera-integrated digital portable telephone.

Next, the circuit construction of the portable telephone 1 will be explained with reference to FIG. 4. In actual, the portable telephone 1 has such an arrangement that a RAM (Random Access Memory) 21, a ROM (Read Only Memory) 22, the display section 9, the CCD camera 7, a transmission/reception circuit 23, the operation inputting section 16 comprising the operation keys 12, jog dial 13, left key 14 and right key 15, a memory stick interface 24 for communication of data between the memory stick 17 (FIG. 1) inserted in the memory stick slot 18 and a bus BUS, an external interface 25 for performing data communications by being connected to an external device such as a personal computer or PDA (Personal Data Assistant), are connected to a CPU (Central Processing Unit) 20 for generally controlling various functions of the portable telephone 1, with the bus BUS, and the microphone 10, the speaker 8 and the antenna 5 are connected to the transmission/reception circuit 23.

Further, in the portable telephone 1, the ROM 22 has stored a basic program and various application programs, and the CPU 20 reads out the programs at proper time to execute them in the RAM 21, thus various functions can be carried out.

For example, the CPU 20 controls the transmission/reception circuit 23 according to operation information which are inputted with the operation inputting section 16 comprising the operation keys 12, jog dial 13, left key 14, and right key 15, in accordance with the basic program to perform various communication processing such as call processing and hang-up processing.

That is, the transmission/reception circuit 23 performs the call processing by transmitting a predetermined control signal to a base station (not shown) via the antenna 5 under the control of the CPU 20, and on the other hand, receives a call-arrival signal from the base station via the antenna 5 and informs the CPU 20 of the call arrival.

Then, the transmission/reception circuit 23 amplifies and then demodulates the received signal, which has been received via the antenna 5, to generate an audio signal, and outputs this from the speaker 8, and on the other hand, modulates and amplifies the audio signal, which has been inputted from the microphone 10, to generates a transmission signal and transmits this from the antenna 5.

In addition, the CPU 20 performs capture processing by controlling the CCD camera 7 in accordance with the operation information which has been inputted with the operation inputting section 16. Then the CPU 20 stores image data obtained by capturing with the CCD camera 7, into the RAM 21 once, so as to display the image data on the display section 9 as required, to store it into the memory stick 17, or to transmit it via the transmission/reception circuit 23.

(3) Item Display Processing

Figure 5:
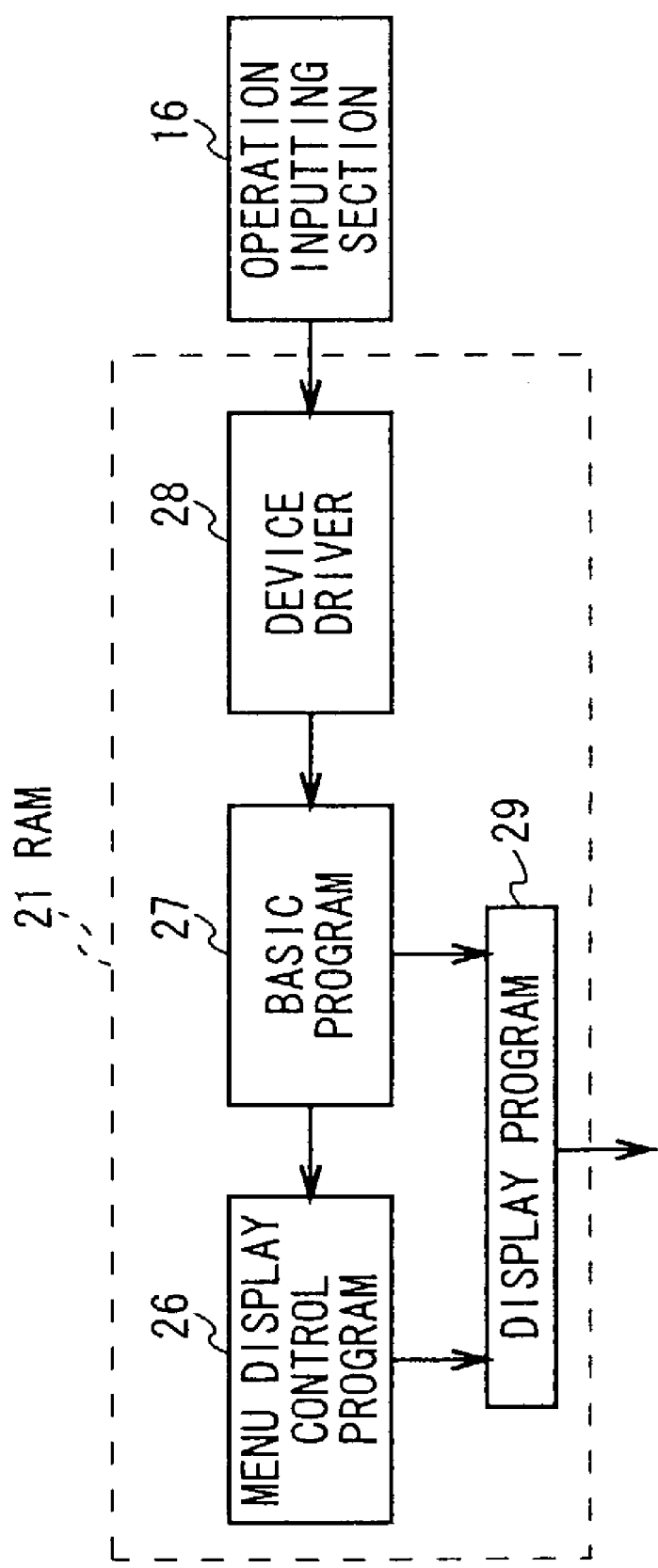
FIG. 5 is a schematic diagram showing a basic program and application programs.

By the way, the portable telephone 1 puts a basic program 27, device driver 28, display program 29 and menu display control program 26, which has been read out from the ROM 22, in the RAM 21 as shown in FIG. 5, to change the display from a high-hierarchical menu to the lower-hierarchical menu corresponding to the high-hierarchical menu, mainly in accordance with the menu display control program 26.

Figure 6:
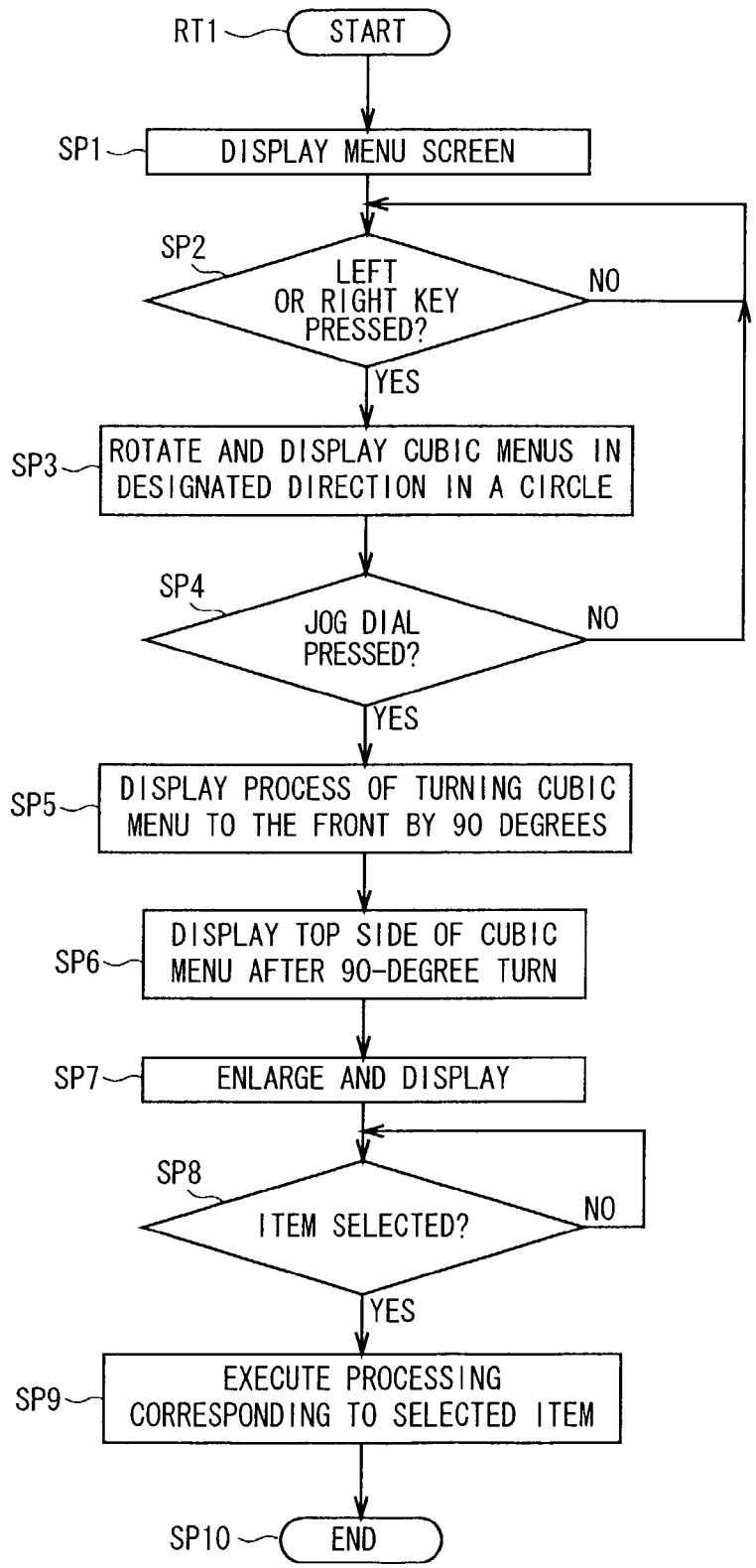
FIG. 6 is a flowchart showing the turning display processing procedure of a cubic menu.
Figure 7:
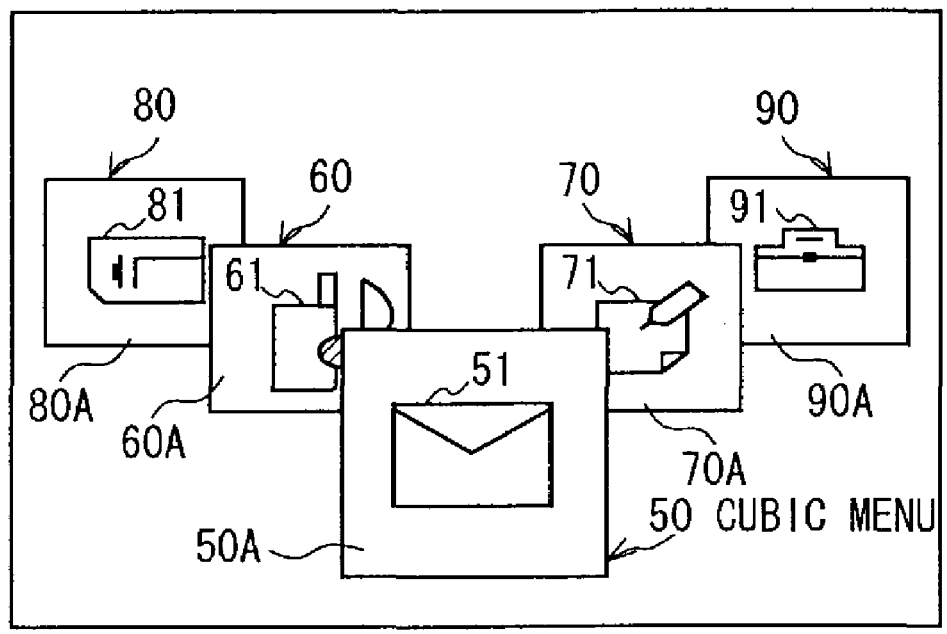
FIG. 7 is a schematic diagram showing a menu screen.

That is, when power is turned on, the portable telephone 1 starts the routine RT1 at start step and then moves on to step SP1 as shown in FIG. 6. At step SP1, the CPU 20 of the portable telephone 1 displays a menu screen 40 as shown in FIG. 7 on the display section 9 and moves on to next step SP2.

In this case, the CPU 20 displays the front side 50A of a cubic menu (hereinafter, referred to as cubic menu) 50 in the center of the menu screen 40, and also displays the front sides 60A, 70A, 80A and 90A of the other cubic menus 60, 70, 80 and 90 behind the cubic menu 50, so as to display them as if the other cubic menus 60, 70, 80 and 90 three-dimensionally exist behind the cubic menu 50, thus making it possible to have such visual effects that the user can three-dimensionally see the cubic menus 50, 60, 70, 80 and 90.

In addition, the CPU 20 displays a mail icon 51 indicating the contents (mail in this case) of the high-hierarchical menu on the front side 50A of the cubic menu 50, so as to make the user immediately know the contents of the high-hierarchical menu through the mail icon 51.

Similarly, as to the other cubic menus 60, 70, 80 and 90, the CPU 20 displays various icons 61, 71, 81 and 91 indicating the contents of the high-hierarchical menus on the front sides 60A, 70A, 80A and 90A, respectively.

Therefore, the CPU 20 simultaneously displays the different kinds of icons 51, 61, 71, 81 and 91 on the menu screen 40, so that the user can recognize the contents (kinds) of the high-hierarchical menus in a moment, and the contents of the high-hierarchical menus can be allowed to be recognized more easily, as compared with the case where the titles of the contents of the high-hierarchical menus are displayed in the form of letters.

At step SP2, the CPU 20 determines whether the user has pressed the left key 14 or right key 15. When a negative result is obtained here, this means that any of the left key 14 and right key 15 has not been pressed, and then the CPU 20 waits for the user to press either one.

On the contrary, if an affirmative result is obtained at step SP2, which means that the left key 14 or right key 15 has been pressed, then the CPU 20 moves to next step SP3.

At step SP3, the CPU 20 recognizes the designated direction based on the pressed left key 14 or right key 15, then simultaneously rotates the cubic menus 50, 60, 70, 80 and 90 in a circular manner in the designated direction, and moves to next step SP4.

Figure 8:
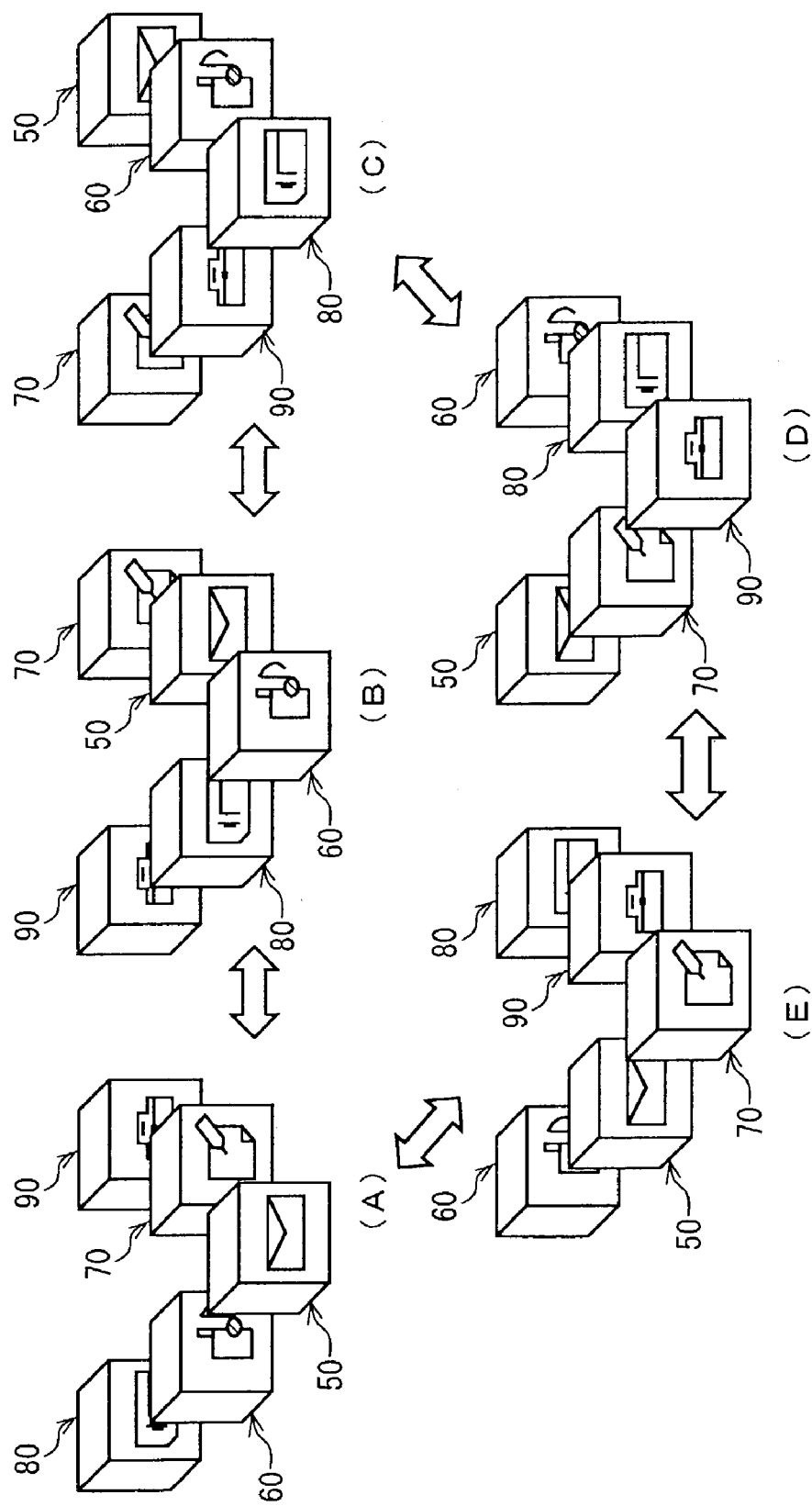
FIG. 8 is a schematic diagram showing the example of rotation display of cubic menus.

In actual, the CPU 20 simultaneously rotates the cubic menus 50, 60, 70, 80 and 90, for example, in the order of FIGS. 8(A), (B), (C), (D), (E) every one press of the right key 15, while simultaneously rotating the cubic menus 50, 60, 70, 80 and 90, for example, in the order of FIGS. 8(A), (E), (D), (C), (B) every one press of the left key 14.

Figure 9:
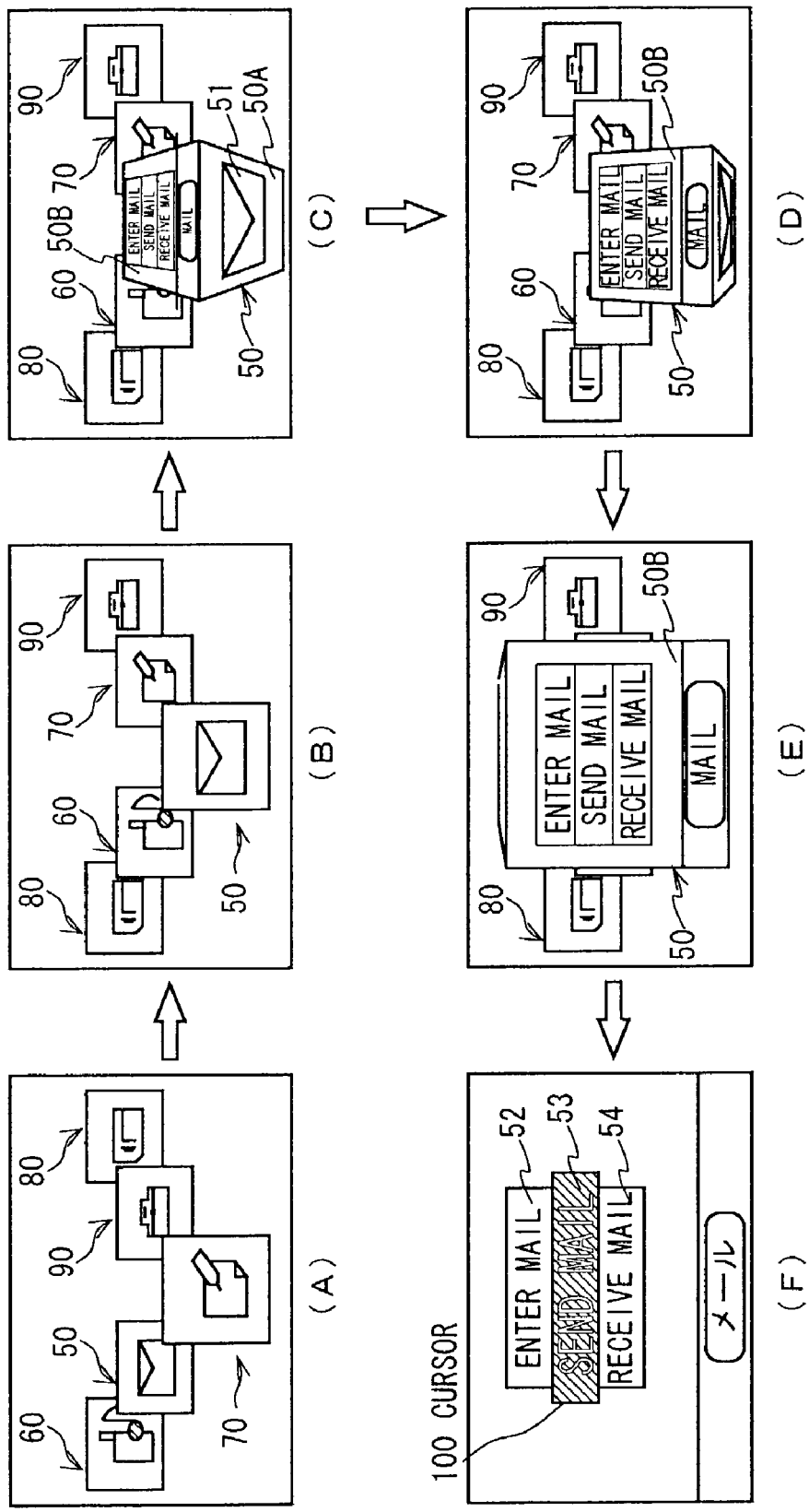
FIG. 9 is a schematic diagram explaining the change from a high-hierarchical menu to a lower-hierarchical menu.

At step SP4, the CPU 20 changes the menu screen 40 from a display in which the cubic menu 70 is displayed in the center of the menu screen 40 as shown in FIG. 9(A) to a display in which the cubic menu 50 is displayed in the center as shown in FIG. 9(B), and then determines under this display whether the jog dial 13 has been pressed.

When a negative result is obtained here, which means that the jog dial 13 has not been pressed and the left key 14 or right key 15 is possible to be pressed, then the CPU 20 returns to step SP2.

On the contrary, when an affirmative result is obtained at step SP4, which means that the jog dial 13 has been pressed, then the CPU 20 moves to next step SP5.

At step SP5, the CPU 20 shows the process of turning the cubic menu 50 to the front by 90 degrees, in response to the pressing operation of the jog dial 13, with, for example, three pieces of interpolation images at a preset display speed (display time and fixed intervals), as shown in FIGS. 9(C) and (D), and moves to next step SP6.

Figure 10:
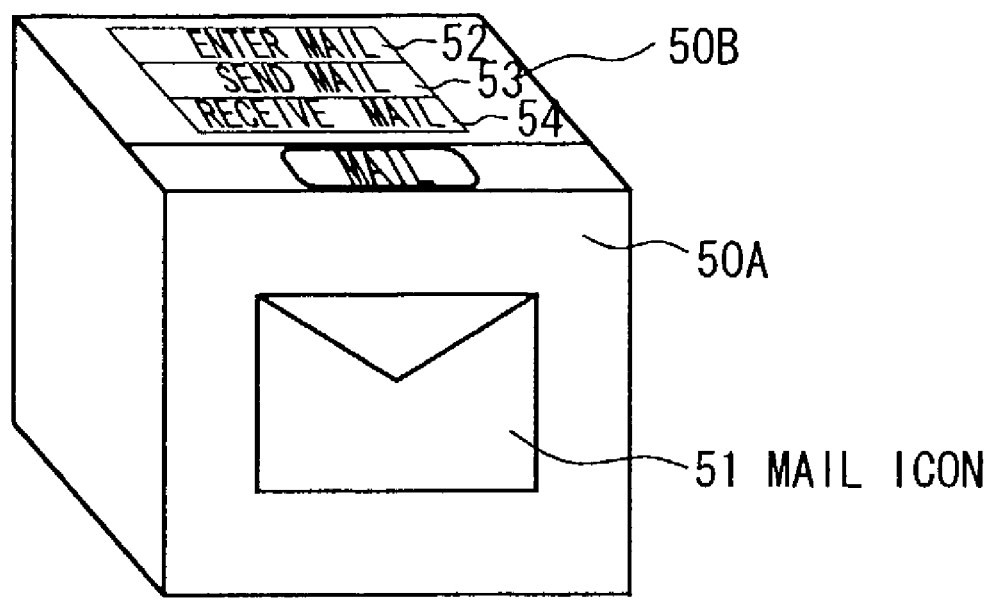
FIG. 10 is a schematic diagram showing a cubic menu.

Now, the CPU 20 displays an "enter mail" item 52, "send mail" item 53, and "receive mail" item 54 on the top side 50B of the cubic menu 50 as a lower-hierarchical menu corresponding to the high-hierarchical menu as shown in FIG. 10, and the CPU 20 gradually displays the various items 52-54 of the lower-hierarchical menu in accordance with the turning operation of the cubic menu 50.

At step SP6, the CPU 20 gradually enlarges the top side 50B of the cubic menu 50, which has been turned by 90 degrees, to the center of the menu screen 40 as shown in FIG. 9(E), and then moves to next step SP7.

At step SP7, the CPU 20 enlarges the top side 50B of the cubic menu 50 to a screen size of the display section 9 in the end as shown in FIG. 9(F), displays the "enter mail" item 52, "send mail" item 53 and "receive mail" item 54 together with a cursor 100 and then moves to next step SP8.

In this case, under a situation where the "send mail" item 53 has been selected by the cursor 100, the CPU 20 displays the "send mail" in non-filled title letters, together with the cursor 100 being displayed in an inverse video (slant lines). Any one of the "enter mail" item 52, "send mail" item 53, and "receive mail" item 54 can be selected with the cursor 100 by the rotating operation of the jog dial 13, and confirmed by the pressing operation.

At step SP8, the CPU 20 determines whether any one out of the "enter mail" item 52, "send mail" item 53, and "receive mail" item 54 has been selected with the cursor 100 by the rotating operation and pressing operation of the jog dial 13.

When a negative result is obtained now, which means that any item has not been selected, then the CPU 20 waits for the jog dial 13 to be pressed. On the contrary, when an affirmative result is obtained, which means that one item has been selected, then the CPU 20 performs the processing corresponding to the selected item and displays the processing result on the display section 9 and then moves to next step SP10 where the processing is terminated.

(4) Operations and Effects

In the aforementioned configuration, the CPU 20 of the portable telephone 20 rotates the cubic menus 50, 60, 70, 80 and 90, which are three-dimensionally displayed on the menu screen 40, in the circular manner in response to the pressing operation of the left key 14 and right key 15, in accordance with the menu display control program 26, as if the rotating operation of the jog dial 13 can be associated, so that a user can visually recognize the change among the plural cubic menus.

In addition, the CPU 20 indicates the contents of the cubic menus 50, 60, 70, 80 and 90 with only various icons 51, 61, 71, 81 and 91 on the menu screen 40, thus making it possible to display them more simply so that the user can recognize the high-hierarchical menu more easily.

Further, the CPU 20 displays the various items 52-54 of the lower-hierarchical menu of the cubic menu 50 confirmed by the pressing operation of the jog dial 13, by showing a process of turning the cubic menu 50 to the front by 90 degrees with the interpolation images (FIG. 9(C) and FIG. 9(D)), and then gradually enlarging them, so as to maintain its continuousness of the display from the mail icon 51 of the high-hierarchical menu to the various items 52 to 54 of the lower-hierarchical menu.

Thereby, the CPU 20 does not change the display from the mail icon 51 of the high-hierarchical menu to the various items 52-54 of the lower-hierarchical menu in a moment, but surely makes the user recognize the change from the high-hierarchical menu to the lower-hierarchical menu, and in addition, gradually enlarges the lower-hierarchical menu of the top side 50B, so as to improve the simplicity of recognizing the various items 52-54 for users.

According to the aforementioned configuration, the CPU 20 of the portable telephone 1 displays the high-hierarchical menu on the front side 50A of the cubic menu 50 and displays the turning process of the cubic menu 50 with the interpolation images, then displays the lower-hierarchical menu corresponding to the high-hierarchical menu on the top side 50B, so as to make the user visually recognize the change from the high-hierarchical menu to the lower-hierarchical menu with maintaining the continuousness among the displays, and as a result, a graphical user interface can be proposed with preventing erroneous operations and with further improving the usability.

(5) Other Embodiments

Note that, the aforementioned embodiment has described the case where the CPU 20 serving as a display means and control means displays the process of turning the cubic menu 50 which has, for example, a cubic shape, by 90 degrees, with the interpolation images, thereby making the user visually recognize the change from the high-hierarchical menu on the front side 50A to the lower-hierarchical menu on the top side 50B. The present invention, however, is not limited to this and it may be possible to use another kind of polyhedron such as a cube, two planes or a hexahedron, in order to make the user visually recognize the change from the high-hierarchical menu to the lower-hierarchical menu which are shown on arbitrary two planes, by turning the polyhedron. In this case, the similar results to the aforementioned embodiment can be obtained.

Further, the aforementioned embodiment has described the case where the CPU 20 serving as a control means displays the process of changing the display from the front side 50A to the top side 50B by turning the cubic menu 50 by 90 degrees, with three interpolation images at a preset display speed. The present invention, however, is not limited to this and another number of pieces of interpolation images and another display speed can be adopted so that it is the easiest for users to visually recognize the change.

Furthermore, the aforementioned embodiment has described the case of showing the process of changing the display from the high-hierarchical menu to the lower-hierarchical menu with the interpolation images. This present invention, however, is not limited to this and a user can freely change the setting to a conventional display method of directly changing the display from the high-hierarchical menu to the lower-hierarchical menu, without interpolation images.

Furthermore, the aforementioned embodiment has described the case of changing the display from the lower-hierarchical menu to the further lower-hierarchical screen at step SP9 of the routine RT1. The present invention, however, is not limited to this and in this case, similarly, the display is changed from the top side 50B to the back side by further turning the cubic menu 50 by 90 degrees, to display the lower-hierarchical screen on the back side.

Furthermore, the aforementioned embodiment has described the case where the CPU 20 displays the mail icon 51 on the front side 50A of the cubic menu 50, and displays the various items 52-54 on the top side 50B by turning the cubic menu 50 to the front by 90 degrees in response to the pressing operation of the jog dial 13. The present invention, however, is not limited to this and plural items as high-hierarchical menus can be displayed on the front side 50A, and a corresponding lower-hierarchical menu can be displayed on the left side, right side or bottom side by turning the cubic menu 50, in correspondence with a high-hierarchical menu selected and confirmed by the rotating operation and pressing operation of the jog dial 13.

Furthermore, the aforementioned embodiment has described the case where the CPU 20 puts the menu display control program 26, which was stored in the ROM 22 in advance, into the RAM 21, and displays the process of turning the cubic menu 50 by 90 degrees with the interpolation images in accordance with the menu display control program 26. The present invention, however, is not limited to this and the aforementioned turning display process can be displayed by inserting a program storage medium storing the menu display control program 26 into the portable telephone 1.

A semiconductor memory, magnetic disk or the like for temporally or permanently storing the menu display control program 26 can be used, in addition to package media such as a floppy disk, CD-ROM (Compact Disc-Read Only Memory) and DVD (Digital Versatile Disc), as a program storage medium which installs the menu display control program 26 to display the aforementioned turning display process into the portable telephone 1 to execute it. In addition, a wired or radio communication medium such as a local area network, the Internet, digital satellite broadcasting can be utilized as a means for storing the menu display control program 26 into a program storage medium, and the storing can be performed via another kind of communication interface such as router or modem.

Furthermore, the aforementioned embodiment has described the case where the present invention is applied to the portable telephone 1. The present invention is not limited to this and can be applied to other various information processing devices such as a personal computer and PDA (Personal Digital Assistant) which have the display section of a relatively small display area.

As described above, according to the present invention, in the case of displaying a high-hierarchical menu and a lower-hierarchical menu including items corresponding to the high-hierarchical menu, the high-hierarchical menu is indicated on one side of a virtual polyhedron being displayed on the display section, and when it is recognized that the high-hierarchical menu has been selected by the inputting operation, the polyhedron is turned and the turning process is displayed with preset interpolation images, then the lower-hierarchical menu is indicated on another side after the polyhedron is turned, thereby the visible continuousness from the high-hierarchical menu to the lower-hierarchical menu can be maintained, so that the user can easily recognize the change from the high-hierarchical menu to the lower-hierarchical menu, thus an information processing device, a menu display method and a program storage medium which are capable of further improving the usability of menus can be realized.

INDUSTRIAL UTILIZATION

The information processing device, menu display method and program storage medium of the present invention is applied to, for example, a portable telephone, PHS (Personal Handyphone System), personal computer, PDA (Personal Digital Assistant) and the like, which have the display section of a relatively small display area.

The invention claimed is:

1. An information processing device for executing prescribed processing corresponding to a selected item, comprising:

display means for displaying one or more virtual polyhedrons on a display section; and control means for controlling said display means for indicating a plurality of symbols each representing a high-hierarchical menu and each located on a first side of a respective polyhedron and, in response to a respective symbol being selected by an inputting operation by a user, for (i) turning said respective polyhedron in accordance with a selected displaying process selected by the user from among a plurality of available displaying processes to provide representations which indicate contents of a lower-hierarchical menu including a name corresponding to said respective symbol on a second side of said respective polyhedron to which said respective polyhedron has been turned such that a number of the symbols representing two or more high-hierarchical menus and the representations of the contents of the lower-hierarchical menu corresponding to said respective symbol are simultaneously displayed after the turning is completed, and (ii) gradually enlarging at least some of the representations on the second side of said respective polyhedron only after the turning of said respective polyhedron to the second side has been completed, said second side being different from said first side such that the name is not on the same side as the respective symbol, in which the plurality of available displaying processes includes a first available displaying process and a second available displaying process, said first available displaying process includes displaying preset successive interpolation images during the turning of said respective polyhedron and simultaneously displaying the number of the symbols representing the two or more high-hierarchical menus and the representations of the contents of the lower-hierarchical menu corresponding to said respective symbol during the turning, and said second available displaying process includes directly turning said respective polyhedron from the respective first side to the respective second side such that the preset successive interpolation images are not displayed during the turning of said respective polyhedron.

2. The information processing device according to claim 1, wherein said control means controls display intervals and a display time of successive ones of said interpolation images when displaying said interpolation images.

3. The information processing device according to claim 1, wherein said display means three-dimensionally displays a plurality of said polyhedrons, which are cubic in shape, in a circular pattern; and said control means rotates an order of the plurality of said polyhedrons in a circular manner in response to a rotation inputting operation by the user of a rotation operating means to select a polyhedron from among said plurality of polyhedrons, and displays one side of a selected polyhedron in a front of the circular pattern.

4. The information processing device according to claim 1, wherein the device is included in a portable telephone or a personal digital assistant.

5. The information processing device according to claim 1, in which during the turning and after the turning is completed of said first available displaying process the contents of the lower-hierarchical menu corresponding to only said respective symbol are simultaneously displayed with the number of the symbols.

* * * * *